United States Patent
Tong (10) Patent No.: US 9,341,784 B2
(45) Date of Patent: May 17, 2016

(54) OPTICAL FIBER FILTER DEVICE AND METHOD FOR MANUFACTURING THE SAME

(75) Inventor: Zhaoyang Tong, Shanghai (CN)

(73) Assignee: ADC Telecommunications (Shanghai) Distribution Co., Ltd. (CN)

( * ) Notice: Subject to any disclaimer, the term of this patent is extended or adjusted under 35 U.S.C. 154(b) by 293 days.

(21) Appl. No.: 13/578,226

(22) PCT Filed: Feb. 4, 2011

(86) PCT No.: PCT/IB2011/050492
§ 371 (c)(1),
(2), (4) Date: Aug. 9, 2012

(87) PCT Pub. No.: WO2011/098939
PCT Pub. Date: Aug. 18, 2011

(65) Prior Publication Data
US 2012/0308182 A1    Dec. 6, 2012

(30) Foreign Application Priority Data
Feb. 12, 2010    (CN) .......................... 2010 1 0116459

(51) Int. Cl.
G02B 6/30    (2006.01)
G02B 6/293    (2006.01)
(Continued)

(52) U.S. Cl.
CPC ........ G02B 6/29362 (2013.01); G02B 6/29368 (2013.01); G02B 27/141 (2013.01); G02B 6/3801 (2013.01); Y10T 29/49826 (2015.01); Y10T 156/10 (2015.01)

(58) Field of Classification Search
CPC ...... G02B 6/262; G02B 6/2817; G02B 6/264; G02B 6/2852; G02B 6/3506; G02B 6/29368
USPC .......................................................... 385/31
See application file for complete search history.

(56) References Cited

U.S. PATENT DOCUMENTS 4,296,995 A    10/1981  Bickel
4,339,170 A     7/1982  Winzer
(Continued)

FOREIGN PATENT DOCUMENTS

CN    201698047        1/2011
EP    0 117 868 A1     9/1984
(Continued)

OTHER PUBLICATIONS

International Preliminary Report on Patentability issued by The International Bureau of WIPO, Geneva, Switzerland, dated Aug. 14, 2012, for related International Application No. PCT/IB2011/050492; 8 pages.

(Continued)

*Primary Examiner* — Ryan Lepisto
*Assistant Examiner* — Erin Chiem
(74) *Attorney, Agent, or Firm* — Merchant & Gould P.C.

(57) ABSTRACT

An optical fiber filter device comprises: a first fiber pigtail assembly (110) having a first optical fiber (111), a second fiber pigtail assembly (120) having a second optical fiber (121), a first optical filtering element (114) and a second optical filtering element (124). The first optical filtering element is arranged between a first port (113) of the first optical fiber and a second port (123) of the second optical fiber and is inclined at an angle to an optical axis of the first optical fiber such that a light component within a first wavelength range emitted from the first port is transmitted through the first optical filtering element and enters the second optical fiber via the second port, and a light component within a second wavelength range emitted from the first port is reflected by the first optical filtering element to form a reflected light. The second optical filtering element is arranged such that the reflected light returns to the first optical fiber via the first port after it has been reflected by the second optical filtering element and again by the first optical filtering element 1.

30 Claims, 7 Drawing Sheets

(51) Int. Cl.
*G02B 27/14* (2006.01)
*G02B 6/38* (2006.01)

(56) References Cited

U.S. PATENT DOCUMENTS

| | | | |
|---|---|---|---|
| 4,448,478 | A | 5/1984 | Matthews et al. |
| 4,705,352 | A | 11/1987 | Margolin et al. |
| 4,867,520 | A | 9/1989 | Weidel |
| 4,900,118 | A * | 2/1990 | Yanagawa et al. ............ 385/24 |
| 5,031,984 | A | 7/1991 | Eide et al. |
| 7,712,970 | B1 | 5/2010 | Lee |
| 2003/0138198 | A1 | 7/2003 | Plickert et al. |

FOREIGN PATENT DOCUMENTS

| | | |
|---|---|---|
| GB | 2069173 A | 8/1981 |
| JP | S57-118214 | 7/1982 |
| JP | S63-282704 | 11/1988 |
| JP | H01-312514 | 12/1989 |
| JP | H04-110807 | 4/1992 |
| JP | H04-212110 | 8/1992 |
| JP | H07-218737 | 8/1995 |
| JP | H08-54541 | 2/1996 |
| JP | 2004-287384 | 10/2004 |
| JP | 2005-062565 | 3/2005 |
| JP | 2009-103838 | 5/2009 |
| JP | 2009-204765 | 9/2009 |

OTHER PUBLICATIONS

International Search Report and Written Opinion issued by the European Patent Office, dated Jun. 22, 2011, for related International Application No. PCT/IB2011/050492; 13 pages.
Chinese Search Report for CN Application No. 201010116459 mailed Feb. 21, 2012 (1 page).
Chinese Supplemental Search Report for CN Application No. 201010116459 mailed Dec. 1, 2012 (1 page).
Notification of Refusal for JP Application No. 2012-552499 mailed Aug. 25, 2014 (3 pages).
Japanese Search Report for JP Application No. 2012-552499 mailed Aug. 26, 2014 (16 pages).
Chinese Search Report for CN Application No. 2010101935319 mailed Jun. 6, 2013 (6 pages).

* cited by examiner

OPTICAL FIBER FILTER DEVICE AND METHOD FOR MANUFACTURING THE SAME

CROSS-REFERENCE TO RELATED APPLICATION

This application claims the benefit of Chinese Patent Application No. 201010116459.X filed on Feb. 12, 2010 in the State Intellectual Property Office of China (patented—Chinese Patent No. CN102156329), the disclosure of which is incorporated herein by reference.

BACKGROUND OF THE INVENTION

1. Field of the Invention

The present invention relates to the technical field of an optical filter device, in particular, to an optical fiber filter device and a method for manufacturing the same.

2. Description of the Related Art

With rapid development and commercialization of Fiber to the home (FTTH) and Fiber to the X (FTTx), the demand for the real-time monitoring of the optical fiber links at a local end and at a user end has been greatly increased recently. In the current FTTx monitoring system, the links are monitored by an Optical Time Domain Reflector (OTDR). In a dominant TDM-PON configuration, as an Optical Power Splitter is shared by a plurality of users, OTDR can attain results synthesized from the links of the plurality of users instead of the link of a single user. However, in a specific monitoring circumstance, it is necessary to acquire distinct detected images of the links between each user end and the local end.

At present, one solution that has been proposed is to insert a Fiber Brag Grating (FBG) in the user end. The FBG has a very narrow intrinsic band in the reflective spectrum (~0.5 nm@3 dB). However, the OTDR monitoring system in the FTTx system requires a wider band in the reflective spectrum to be adapted for the deviation or drift (20 nm) of the center wavelength of a laser. Although the technology of chirp can enhance the band width of the FBG, it will be very expensive and the overall optical performance of the monitoring system will be reduced significantly due to the widen band of the FBG.

Conventionally, the FBG may be manufactured by means of a two-beam interferometer or phase masks. The solution employing two-beam interference is generally used in the field of research and development and is not suitable for mass production. In contrast, the phase masks can be used in mass production by virtue of its simplified and controllable process. In consideration of the narrow intrinsic band of the FBG (~0.5 nm@3 dB) made by single phase mask, a plurality of phase masks or nonperiodic phase masks are necessarily used to form chirp FBG to enhance the band width of reflective spectrum. However, the customized phase mask with the reflective spectrum of 20 nm is extremely expensive. In the meanwhile, in the solution of chirp FBG, the overall optical performance of the system degrades remarkably as the band width of the reflective spectrum of FBG increases.

Therefore, it is desirable to provide an optical filter device with wide reflective spectrum, high reflection isolation and low cost to acquire the required detection signals from the OTDR.

SUMMARY OF THE INVENTION

The object of the present invention is to eliminate or at least alleviate the above problems in the prior art.

Accordingly, an object of the present invention is to provide an optical fiber filter device and a method for manufacturing the same, in which optical filtering elements and the fiber pigtail assemblies separate the incident lights based on the difference in spectra and induce the light with a high band width, a high reflectivity and a high reflection isolation back into the incident optical fiber to provide the detection signals required for the OTDR.

Another object of the present invention is to provide an optical fiber filter device and a method for manufacturing the same, in which the structure and the optical path are configured to implement multiple reflection of the incident light to achieve a high reflection isolation by optical filtering elements with conventional reflection isolation while cost of the device is reduced.

In accordance with an aspect of the present invention, there is provided an optical fiber filter device, comprising: a first fiber pigtail assembly and a second fiber pigtail assembly, the first fiber pigtail assembly comprising a first optical fiber and a first fiber accommodating member which accommodates the first optical fiber, the second fiber pigtail assembly comprising a second optical fiber and a second fiber accommodating member which accommodates the second optical fiber, the first optical fiber having a first port and the second optical fiber having a second port; and a first optical filtering element and a second optical filtering element, which each transmit a light within a first wavelength range and reflect a light within a second wavelength range.

The first optical filtering element is arranged between the first port and the second port and is inclined at an angle to an optical axis of the first optical fiber such that a light component within the first wavelength range emitted from the first port is transmitted through the first optical filtering element and enters the second optical fiber via the second port, and a light component within the second wavelength range emitted from the first port is reflected by the first optical filtering element to form a reflected light. The second optical filtering element is arranged in an optical path of the reflected light such that the reflected light returns to the first optical fiber via the first port after it has been reflected by the first and second optical filtering elements again at least twice.

In an embodiment, a space between the first port and the second port may be filled with a refractivity-matched substance.

In an embodiment, the angle may be more than 0 degree and less than 90 degree.

In an embodiment, the angle may be 45 degree.

In an embodiment, a reflective surface of the second optical filtering element may be perpendicular to a direction in which the reflected light is incident on the second optical filtering element.

In an embodiment, the light component within the first wavelength range emitted from the first port may enter the second optical fiber via the second port along an optical axis of the second optical fiber.

In an embodiment, the first optical filtering element may be arranged on an end face of the first port.

In an embodiment, the second optical filtering element may be arranged on a side surface of the first optical fiber adjacent to the first port.

In an embodiment, the second optical filtering element may be embedded in the first optical fiber adjacent to the first port.

In an embodiment, the end face of the first port may protrude from an end face of the first fiber accommodating member, and an end face of the second port may protrude from an end face of the second fiber accommodating member.

In an embodiment, the end face of the first port may be flush with an end face of the first fiber accommodating member, and an end face of the second port may be flush with an end face of the second fiber accommodating member.

In an embodiment, the first fiber accommodating member may be provided with a slit or a side opening for receiving the second optical filtering element.

In an embodiment, the end face of the first fiber accommodating member may be perpendicular to the optical axis of the first optical fiber, and the end face of the second fiber accommodating member may be perpendicular to the optical axis of the second optical fiber.

In an embodiment, the end face of the first fiber accommodating member may be inclined to the optical axis of the first optical fiber, and the end face of the second fiber accommodating member may be inclined to the optical axis of the second optical fiber.

In an embodiment, the first optical filtering element may be arranged on an end face of the second port.

In an embodiment, the second optical filtering element may be arranged on an end face of the first fiber accommodating member external to the first optical fiber.

In an embodiment, the second optical filtering element may be arranged on an end face of the first port.

In an embodiment, the end face of the second port may be flush with an end face of the second fiber accommodating member.

In an embodiment, the end face of the second port may protrude from an end face of the second fiber accommodating member.

In an embodiment, the first and second optical filtering elements are film filters.

In an embodiment, the optical fiber filter device may further comprise: a tube in which the first and second optical filtering elements and the first and second fiber pigtail assemblies are accommodated separately or in combination; and a housing in which the tube is accommodated.

In accordance with another aspect of the present invention, there is provided a method for manufacturing an optical fiber filter device, comprising the steps of:

(a) providing a first fiber pigtail assembly, a second fiber pigtail assembly, a first optical filtering element and a second optical filtering element, the first fiber pigtail assembly comprising a first optical fiber and a first fiber accommodating member which accommodates the first optical fiber, the second fiber pigtail assembly comprising a second optical fiber and a second fiber accommodating member which accommodates the second optical fiber, the first optical fiber having a first port and the second optical fiber having a second port, the first and second optical filtering elements each transmitting a light within a first wavelength range and reflecting a light within a second wavelength range;

(b) arranging the first optical filtering element in an optical path of a light emitted from the first port, inclining it at an angle to an optical axis of the first optical fiber such that a light component within the first wavelength range emitted from the first port is transmitted through the first optical filtering element, and a light component within the second wavelength range emitted from the first port is reflected by the first optical filtering element to form a reflected light, and arranging the second optical filtering element in an optical path of the reflected light such that the reflected light returns to the first optical fiber via the first port after it has been reflected by the first and second optical filtering elements again at least twice;

(c) accommodating the first and second fiber pigtail assemblies in a tube to allow the light transmitted through the first optical filtering element to enter the second optical fiber via the second port; and (d) securing the first and second fiber pigtail assemblies in combination with the tube.

In an embodiment, the step (b) may further comprise: filling a space between the first port and the second port with a refractivity-matched substance.

In an embodiment, the step (b) may further comprise: adjusting the optical paths such that the reflected light is reflected by the first and second optical filtering elements to enter the first optical fiber with a maximum power; and the step (c) may further comprise: adjusting the optical paths such that the light transmitted through the first optical filtering element is coupled to the second fiber with a maximum coupling efficiency.

In an embodiment, the method may further comprise: bonding or depositing directly the first optical filtering element onto an end face of the first port.

In an embodiment, the method may further comprise: bonding or depositing directly the second optical filtering element onto a side surface of the first optical fiber adjacent to the first port; or embedding the second optical filtering element in the first optical fiber adjacent to the first port.

In an embodiment, the method may further comprise: bonding or depositing directly the first optical filtering element onto an end face of the second port.

In an embodiment, the method may further comprise: bonding or depositing directly the second optical filtering element onto an end face of the first fiber accommodating member external to the first optical fiber.

In an embodiment, the method may further comprise: bonding or depositing directly the second optical filtering element onto an end face of the first port.

In an embodiment, the method may further comprise: polishing the end face or the side surface and coating the end face or the side surface with antireflection films before the first or the second optical filtering element is bonded or deposited.

With the above configuration, the expensive chirp FBG is replaced with a feedback optical design structure using optical filtering elements to acquire the detection signals required for the OTDR such that the band width of the reflected light is improved to achieve an improved optical performance. The above configurations of the present invention may further have advantages of simplified manufacturing process, low cost and high reliability of the device over the prior art.

The present invention can achieve high reflection isolation, high return loss and good reflectivity by the multiple reflection of light in the optical fiber filter device with the film filters at low cost and low reflection isolation. Furthermore, the optical fiber filter device according to the present invention is easy to be integrated with other optical devices due to its miniature size of the core components.

BRIEF DESCRIPTION OF THE DRAWINGS

The specific embodiments of the optical fiber filter device according to the present invention and its manufacturing method will be described with reference to the accompanying drawings.

DETAILED DESCRIPTION OF THE EMBODIMENTS

Specific embodiments of the present invention will be described hereinafter in detail with reference to the accompanying drawings. In the drawings, like reference numerals refer to like parts. The embodiments are described below in order to explain the general concept of the present invention without limitations on the scope of the invention.

Figure 1:
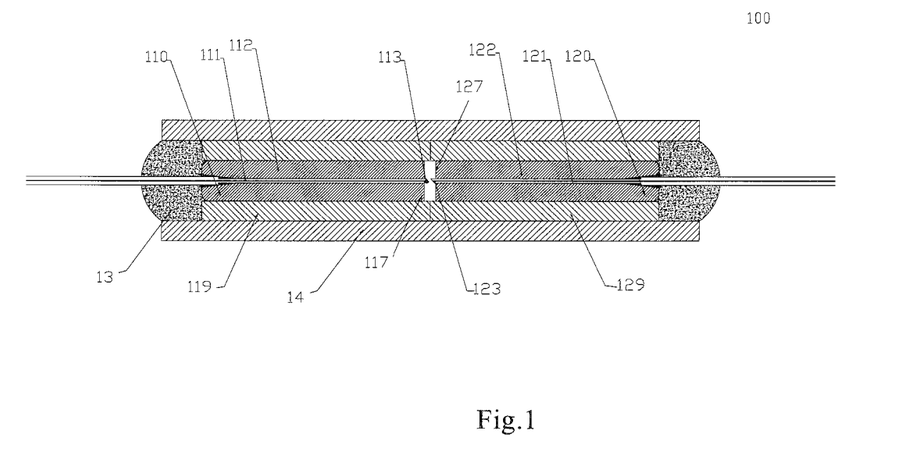
FIG. 1 is a schematic sectional view showing an optical fiber filter device according to an embodiment of the present invention.
Figure 2:
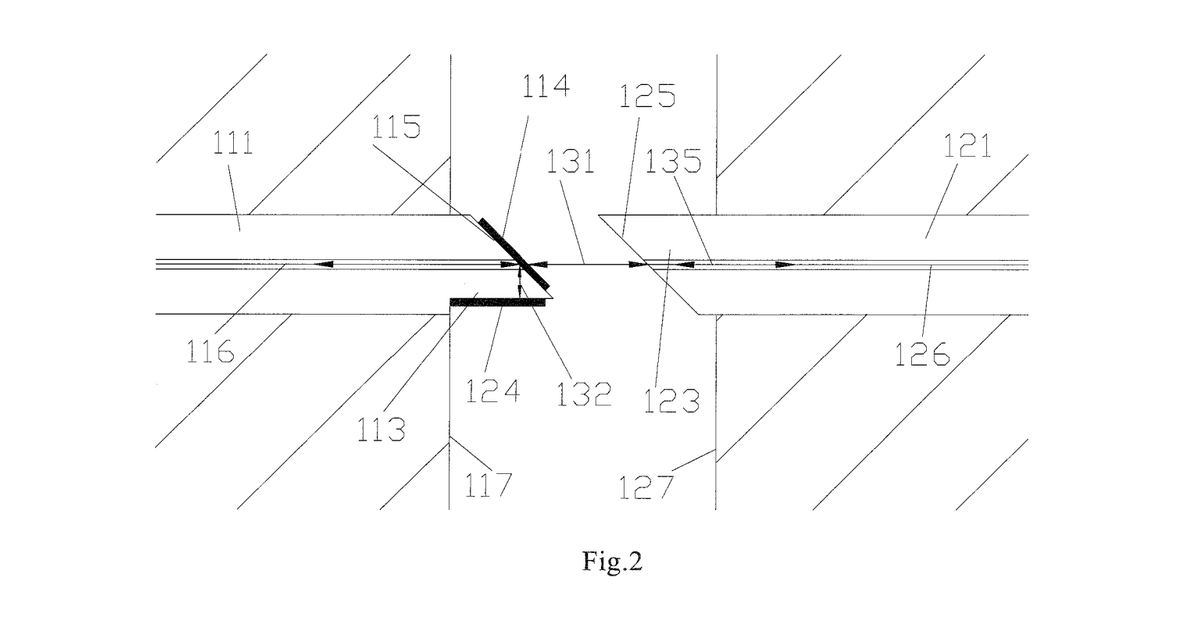
FIG. 2 is an enlarged view of the middle part of the optical fiber filter device shown in the FIG. 1.

FIG. 1 and FIG. 2 show an optical fiber filter device. In FIG. 1, the optical fiber filter device 100 according to an embodiment of the present invention is illustrated. The optical fiber filter device 100 comprises a first fiber pigtail assembly 110 and a second fiber pigtail assembly 120. The first fiber pigtail assembly 110 comprises a first optical fiber 111 and a first fiber accommodating member 112 which accommodates the first optical fiber 111. The second fiber pigtail assembly 120 comprises a second optical fiber 121 and a second fiber accommodating member 122 which accommodates the second optical fiber 121. The first optical fiber 111 has a first port 113 and the second optical fiber 121 has a second port 123. The first fiber accommodating member 112 and the second fiber accommodating member 122 may, for example, be a capillary tube or other members which can accommodate and fix the optical fiber.

The optical fiber filter device 100 further comprises a first optical filtering element 114 and a second optical filtering element 124. The first optical filtering element 114 and the second optical filtering element 124 each transmit a light within a first wavelength range ($\lambda_{1a}$, $\lambda_{1b}$) and reflect a light within a second wavelength range ($\lambda_{2a}$, $\lambda_{2b}$). As illustrated in the FIG. 2, the first optical filtering element 114 may be arranged on an end face 115 of the first port 113 such that a light component within the first wavelength range ($\lambda_{1a}$, $\lambda_{1b}$) emitted from the first port 113 is transmitted through the first optical filtering element 114 to form a transmitted light 131. The transmitted light 131 enters the second optical fiber 121 via the second port 123. The first optical filtering element 114 is inclined at an angle α to an optical axis 116 of the first optical fiber 111 such that a light component within the second wavelength range ($\lambda_{2a}$, $\lambda_{2b}$) emitted from the first port 113 is reflected by the first optical filtering element 114 to form a reflected light 132. The second optical filtering element 124 is arranged in an optical path of the reflected light 132 such that the reflected light 132 is reflected by the second optical filtering element 124 to the first optical filtering element 114, and returns to the first optical fiber 111 via the first port 113 after it is reflected by the first optical filtering element 114 again. That is, the reflected light 132 is fed back to the first optical fiber 111 after it has been reflected by the first and second optical filtering elements 114, 124 again twice in order to provide a detection signal required for the OTDR.

In the above configuration, the light component within the second wavelength range ($\lambda_{2a}$, $\lambda_{2b}$) emitted from the first port 113 is reflected by the first optical filtering element 114 and the second optical filtering element 124 three times in total. By means of the multiple reflections, the reflection isolation of the optical filtering can be improved significantly. For example, in the circumstance where a light is reflected by a conventional film filter with a reflection isolation of 14 dB, the reflection isolation of the optical filtering can be up to over 40 dB. Further, the return loss also increases as the reflection isolation is enhanced. In the meanwhile, as the selection of the reflected wavelength range ($\lambda_{2a}$, $\lambda_{2b}$) the first optical filtering element 114 and the second optical filtering element 124, e.g., the film filters are much wider or more flexible than that of the chirp FBG, the band width of the light fed back to the first optical fiber 111 can be enhanced prominently instead of being limited to the narrow band width of the FBG. Thus, the negative influence of the wavelength drifts of the OTDR due to the environment variations (e.g., temperature variations) to the reflectivity of the detection signal fed back to the OTDR may be reduced, or substantially eliminated.

In the above embodiment shown in FIG. 1 and FIG. 2, the first optical filtering element 114 is arranged on the end face 115 of the first port 113. However, as appreciated by the skilled person in the art, the present invention is not limited to this. For example, the first optical filtering element 114 may also be arranged on an end face 125 of the second port 123 of the second optical fiber 124, or anywhere between the first port 113 and the second port 123 by additional mounting means. All of these solutions can achieve the optical filtering of the first optical filtering element 114 to the light emitted from the first port 113 such that the light component within the first wavelength range ($\lambda_{1a}$, $\lambda_{1b}$) is transmitted through the first optical filtering element 114 and enters the second optical fiber 121 via the second port 123. Other embodiments which can achieve the same function as that of the above embodiments also fall within the scope of the present invention.

In the above embodiment shown in FIG. 1 and FIG. 2, the second optical filtering element 124 is arranged on a side surface of the first optical fiber adjacent to the first port 113. In order to grind or polish the side surface on which the second optical filtering element 124 is arranged, a groove which receives the second optical filtering element 124 may be formed at the corresponding location on the side surface. The groove may be planar or curve. However, as appreciated by the skilled person in the art, the present invention is not limited to this. For example, the second optical filtering element 124 may be arranged anywhere in the optical path of the reflected light, e.g., arranged on a certain location internal or external to the first optical fiber 111 or arranged on a component (e.g. a wedge) protruding from the side surface of the optical fiber. For instance, in FIG. 4, the second optical filtering element 124 is embedded in the first optical fiber 111. In all of these solutions, the reflected light 132 can return to the first optical fiber 111 via the first port 113 after it has been reflected by the first optical filtering element 114 and the second optical filtering element 124 at least twice. Other embodiments which can achieve the same function as that of the above embodiments also fall within the scope of the present invention.

As illustrated in FIG. 1, the optical fiber filter device 100 may further comprise: a tube 119 in which the first fiber pigtail assembly 110 is accommodated, a tube 129 in which the second fiber pigtail assembly 120 is accommodated, adhesives 13 and a housing 14. The first and second optical filtering elements 114, 124 may also be accommodated in the tubes respectively. The tubes 119 and 129 may be housed and fixed in the housing 14. The adhesives 13, e.g., epoxy glues or ultraviolet glues, additionally adhere and fix the first optical fiber 111 and the second optical fiber 121 to the tubes 119, 129 and the housing 14. Such arrangement of the tubes and the housing can prevent the optical fiber filter device from being deteriorated by impacts, vibrations and other harmful environment factors. Although FIG. 1 shows an arrangement in which the first fiber pigtail assembly 110 and the first optical filtering element 114, the second fiber pigtail assembly 120 and the second optical filtering element 124 are accommodated in the two tubes 119 and 129 respectively, the embodiments of the present invention are not limited to this. For instance, one or more of the first fiber pigtail assembly 110, the first optical filtering element 114, the second fiber pigtail assembly 120 and the second optical filtering element 124 may be accommodated and fixed in one or more tubes separately or in any combinations.

In an embodiment, a space between the first port 113 and the second port 123 may be filled with a refractivity-matched substance in order to reduce the Fresnal reflections and the optical loss. The refractivity-matched substance may have a refractivity which is equal or substantially equal to that of the first optical fiber or the first optical filtering element such that the light component emitted from the first port 113 or transmitted through the first optical filtering element 114 is directed substantially in a line at interfaces between different media to enter the second port along an optical axis of the optical fiber 121 in order to improve the fiber coupling efficiency.

Alternatively, the refractivity-matched substance may also have a different refractivity from that of the first optical fiber or the first optical filtering element such that the light component emitted from the first port 113 or transmitted through the first optical filtering element 114 is deflected at the interfaces between different media. The deflection of the direction of the light may be compensated by regulating the position of the second optical fiber with respect to the first optical fiber, e.g., shifting the optical axis 126 of the second optical fiber 121 relative to the optical axis 116 of the first optical fiber 111 or inclining the optical axis 126 relative to the optical axis 116 of the first optical fiber 111 at a certain angle. With the above regulation, the light transmitted through the first optical filtering element will still enter the second port along the optical axis 126 of the second optical fiber 121 to achieve a high fiber coupling efficiency. The refractivity-matched substance may be filled in the space between the first fiber pigtail assembly 110 and the second fiber pigtail assembly 120.

In the circumstance where the refractivity-matched substance is absent, the position of the optical axis 126 of the second optical fiber 121 may be regulated relative to the optical axis 116 of the first optical fiber 111, e.g., by shifting the optical axis 126 of the second optical fiber 121 relative to the optical axis 116 of the first optical fiber 111 or inclining the optical axis 126 relative to the optical axis 116 of the first optical fiber 111 at a certain angle, to improve the fiber coupling efficiency. The shift or angle depends on the refractivity of the optical fibers and the first optical filtering element and the distance between the first end face 113 and the second end face 123.

In the embodiments of the present application, the inclination angle α of the optical filtering element 114 with respect to the optical axis 116 of the first optical fiber 111 is defined as an acute angle between the first optical filtering element 114 and the optical axis 116 of the first optical fiber 111.

Figure 3:
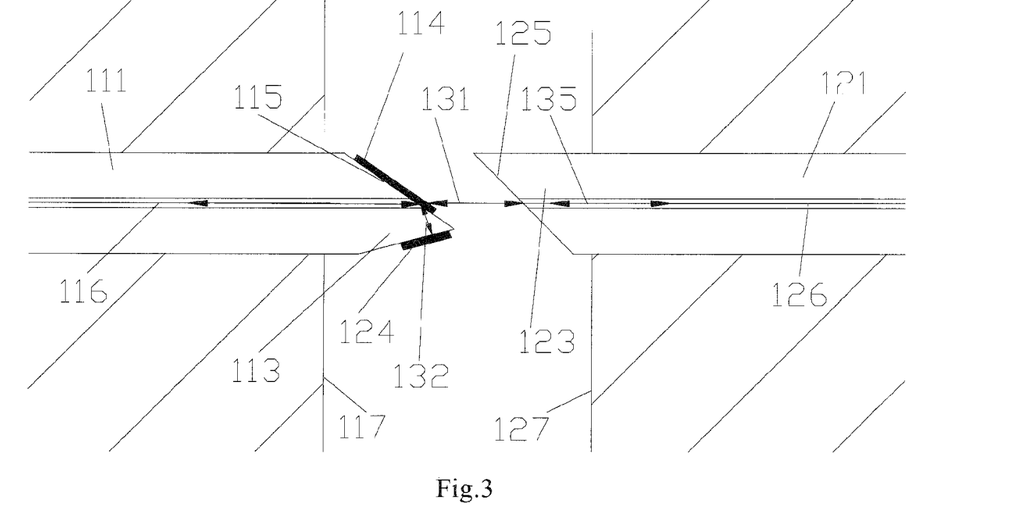
FIG. 3 is a schematic view showing part of an optical fiber filter device according to another embodiment of the present invention.
Figure 4:
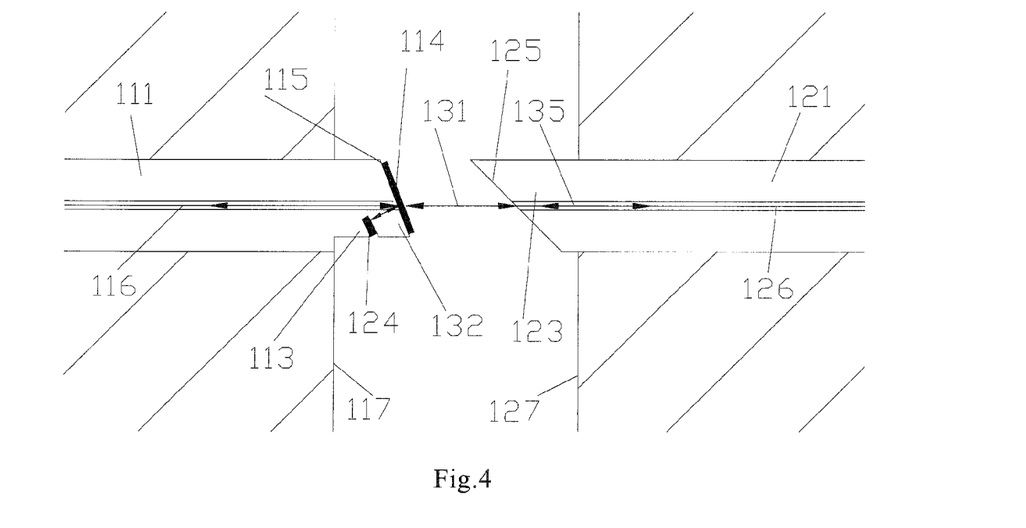
FIG. 4 is a schematic view showing part of an optical fiber filter device according to a further embodiment of the present invention.
Figure 5:
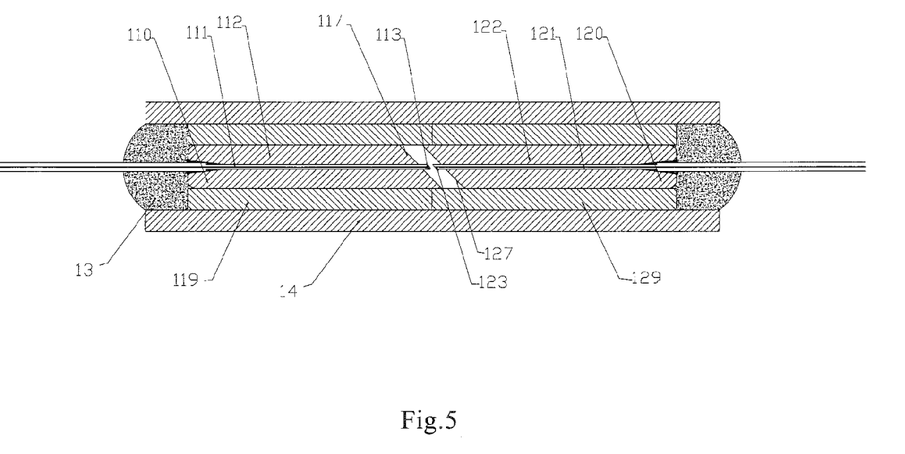
FIG. 5 is a schematic sectional view showing an optical fiber filter device according to another embodiment of the present invention.
Figure 6:
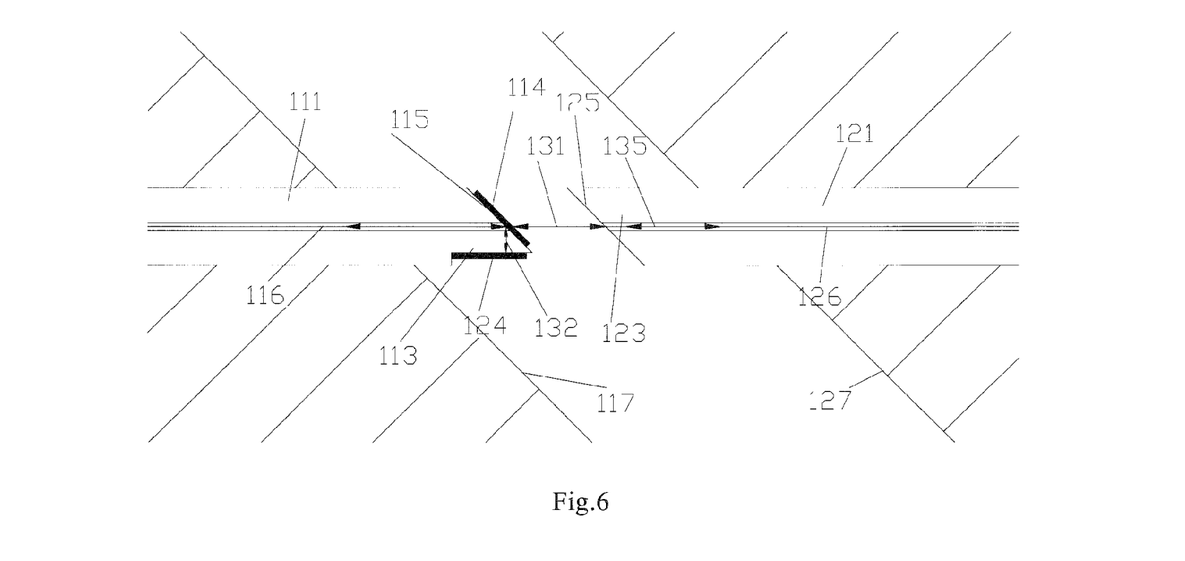
FIG. 6 is an enlarged view of the middle part of the optical fiber filter device shown in the FIG. 5.

In the embodiment shown in FIG. 1 and FIG. 2, the inclination angle α of the optical filtering element 114 with respect to the optical axis 116 of the first optical fiber 111 may be 45 degree. In this case, the reflected light 132 is perpendicular to the optical axis 116. Thus, the second optical filtering element 124 may be arranged in parallel to the optical axis 116 to allow the reflected light 132 to retrace its optical path. Therefore, the side surface of the optical fiber on which the second optical filtering element is arranged can be processed easily to simplify the procedures and save the costs. However, the inclination angle α may be other values, for example, more than 0 degree and less than 90 degree. The orientation of the second optical filtering element 124 depends on the inclination angle α. As illustrated in FIG. 3, the inclination angle α is more than 45 degrees, and thus, the reflected light 132 is inclined outwards the first port 113 of the first optical fiber 111 instead of being perpendicular to the optical axis 116. In this circumstance, the reflective surface of the second optical filtering element 124 may be inclined accordingly at another angle with respect to the optical axis 116 such that the reflected light 132 retraces its optical path. In contrast, FIG. 4 shows the case where the inclination angle α is less than 45 degrees. The reflected light 132 is inclined inwards the first optical fiber 111 instead of being perpendicular to the optical axis 116. In this circumstance, the orientation and the location of the reflective surface of the second optical filtering element 124 is also regulated accordingly such that the reflected light 132 retraces its optical path. For example, in FIG. 4, the second optical filtering element is embedded in the first optical fiber 111 adjacent to the first port 113 and inclined relative to the optical axis 116.

In an embodiment, the reflective surface of the second optical filtering element 124 is perpendicular to the reflected light 132 which is incident on the second optical filtering element 124. In such circumstance, the reflected light 132 is reflected by the second optical filtering element 124 to retrace the path to the first optical filtering element 114, and then is reflected by the first optical filtering element 114 along the optical axis 116 of the first optical fiber 111 back to the first port 115. The orientation and location of the second optical filtering element 124 is matched with the inclination angle α in order to allow the reflective surface of the second optical filtering element 124 to be perpendicular to the reflected light 132 which is incident on the second optical filtering element 124, as illustrated in FIGS. 2-4.

In the above embodiments, the inclination angle α is selected such that the total reflection is avoided at the interfaces of media to ensure the light within the second wavelength range to transmit through the first optical filtering element.

In the above embodiments, the optical filtering element may be arranged at the corresponding end face or side surface by, e.g., bonding, depositing or coating. In order to improve the transmission efficiency or other optical performance, the corresponding location of the end face or side surface of the optical fiber or the fiber accommodating member may be processed, e.g., grinded, polished, before the optical filtering element is mounted. The polished surface may further be coated with antireflection films.

In the embodiments shown in FIGS. 1-3, the end face 117 of the first fiber accommodating member 112 may be perpendicular to the optical axis 116 of the first optical fiber 111, and the end face 127 of the second fiber accommodating member 122 may be perpendicular to the optical axis 126 of the second optical fiber 121. However, the present invention is not limited to this. The end face 117 and the end face 127 may be inclined relative to the optical axis 116 and the optical axis 117 respectively, as illustrated in FIGS. 5-9.

In the embodiments shown in FIGS. 1-6, the end face 115 of the first port 113 may protrude from the end face 117 of the first fiber accommodating member 112 and the end face 125 of the second port 123 may protrude from the end face 127 of the second fiber accommodating member 122. In this case, after the corresponding location of the end face or side surface of the optical fiber or the fiber accommodating member is processed, the end face 115 of the first port 113 and the end face 125 of the second port 123 are necessarily processed separately to ensure high transmission efficiency before the optical filtering elements are mounted. Thus, the process of the end face 115 of the first port 113 and the end face 125 of the second port 123 is separated from the process of the end face 117 of the first fiber accommodating member 112 and the end face 127 of the second fiber accommodating member 122 in order to prevent the quality of the end face 115 and the end face 125 from being deteriorated by the process of the end face 117 and the end face 127.

Figure 7:
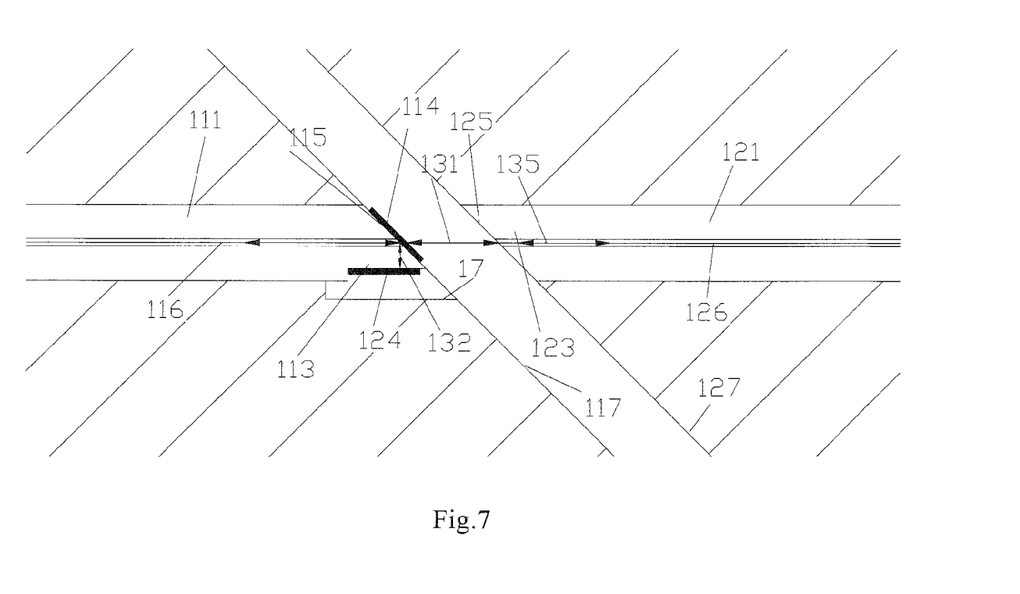
FIG. 7 is a schematic view showing part of an optical fiber filter device according to a further embodiment of the present invention.
Figure 8:
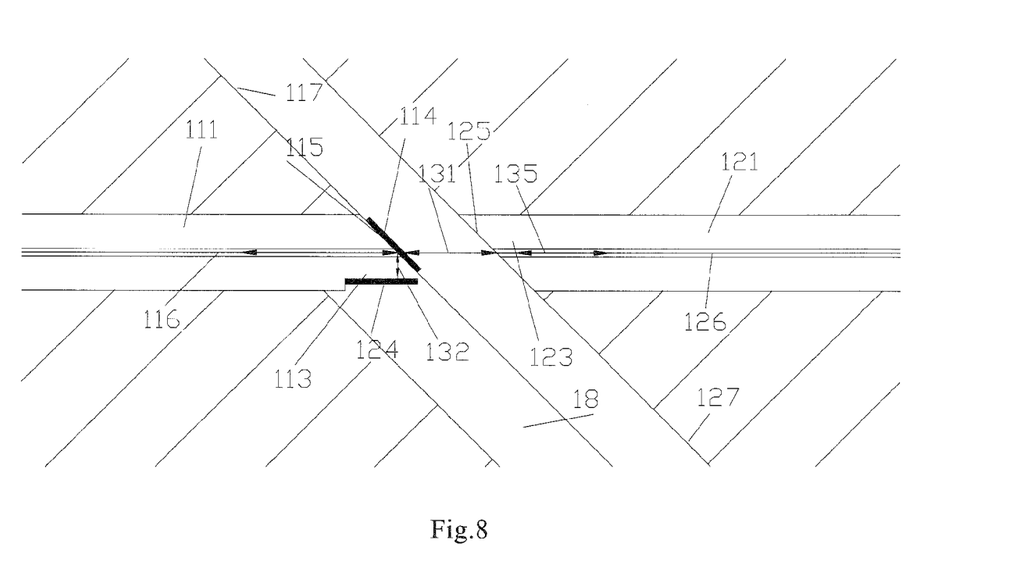
FIG. 8 and FIG. 9 show variations of the embodiment shown in the FIG. 7.
Figure 9:
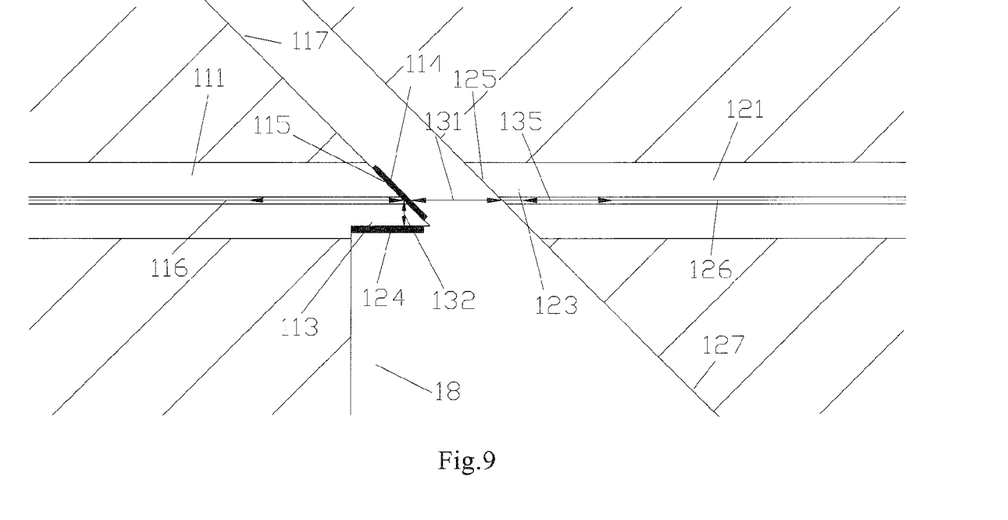

In another embodiment, as shown in FIGS. 7-9, the first port 113 and the second port 123 may be buried in the first fiber accommodating member 112 and the second fiber accommodating member 122 and the end face 115 of the first port 113 is flush with the end face 117 of the first fiber accommodating member 112 and the end face 127 of the second port 123 is flush with the end face 117 of the second fiber accommodating member 122. As the end face 115 and end face 125 are flush with the end face 117 and the end face 127 respectively, the end face 115 and end face 117, or the end face 125 and the end face 127 may be simultaneously processed, e.g., ground and polished, instead of being processed separately, so as to simplify the processes and save the costs.

In the embodiment in which the end face 115 and the face 125 are flush with the end face 117 of the first fiber accommodating member 112 and the end face 127 of the second fiber accommodating member 122, a fiber surface on which the second optical filtering element 124 is arranged may be exposed such that the second optical filtering element 124 can be mounted easily. For instance, a slit 17 may be formed in the first fiber accommodating member 112 adjacent to the location on which the second optical filtering element is arranged such that the fiber surface can be exposed, as shown in FIG. 7. Alternatively, a side opening 18 may be formed from a side of the first fiber accommodating member 112 to expose the location on which the second optical filtering element 124 is arranged. The side opening 18 may be a partial side opening, i.e., only a part of the side corresponding to the first fiber accommodating member 112 and the second optical filtering element 124 is removed, as shown in FIG. 8; or the side opening 18 may be a complete side opening, i.e., the side corresponding to the first fiber accommodating member 112 and the second optical filtering element 124 is completely removed, as shown in FIG. 9.

FIGS. 10-13 show further embodiments according to the present invention. In these embodiments, the first optical filtering element 114 is arranged on the end face 125 of the second port 123 of the second optical fiber 121 instead of being arranged on the end face of the first port 113 of the first optical fiber 111.

Figure 10:
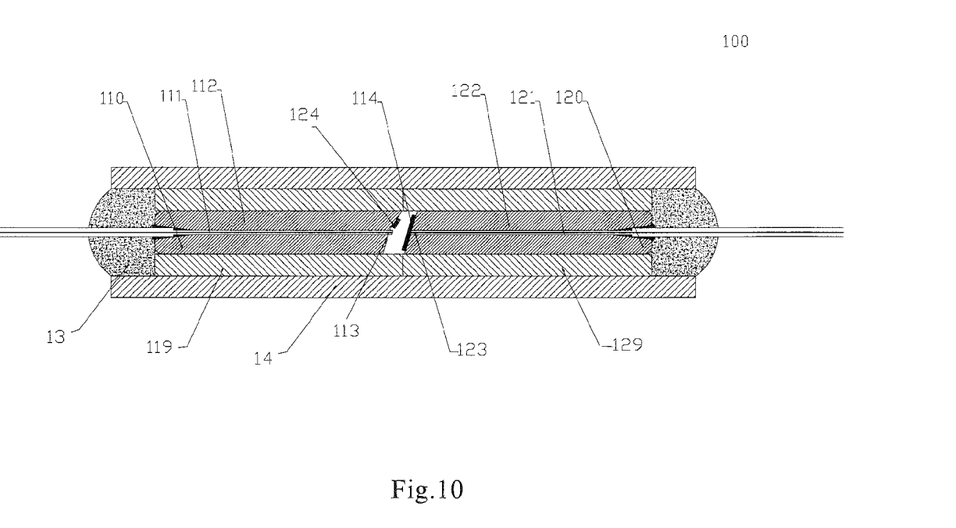
FIG. 10 is a schematic sectional view showing an optical fiber filter device according to another embodiment of the present invention.
Figure 11:
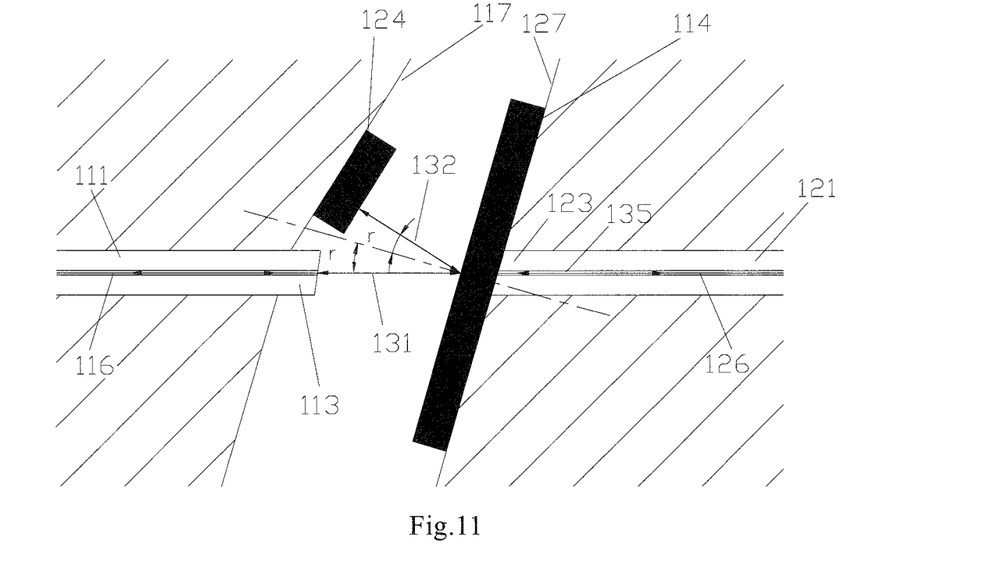
FIG. 11 is an enlarged view of the middle part of the optical fiber filter device shown in the FIG. 10.

In the embodiment shown in the FIGS. 10-11, the second optical filtering element 124 is arranged on the end face 117 of the first fiber accommodating member 112 external to the first optical fiber 111. The first optical filtering element 114 may be inclined relative to the optical axis 116 of the first optical fiber 111 at an angle which is, for example, more than 0 degree and less than 90 degree, such as 18 degree, or 45 degree. As appreciated by the skilled person in the art, the angle $\alpha$ should be selected such that the total reflection is avoided at the interfaces of media to ensure the light within the second wavelength range to transmit through the first optical filtering element. Assuming that the normal of the reflective surface of the first optical filtering element 114 is inclined to the optical axis 116 of the first optical fiber 111 at an angle $\gamma$, i.e., $\gamma=90°-\alpha$. In accordance with the law of reflection, the angle at which the reflected light 132 is inclined to the normal of the reflective surface is also $\gamma$. In order to simplify the optical path design, the reflective surface of the second optical filtering element 124 may be perpendicular to the reflected light 132 which is incident on the second optical filtering element 124. In this circumstance, the second optical filtering element 124 is inclined to the optical axis 116 of the first optical fiber 111 at an angle of "$90°-2\gamma$". The reflected light 132 is reflected by the second optical filtering element 124 to retrace its optical path to the first optical filtering element 114, and then is reflected by the first optical filtering element 114 directly along the optical axis 116 of the first optical fiber 111 back to the first port 113. Before the second optical filtering element 124 is arranged, the location of the end face 117 (which can located on either side external to the first optical fiber 111) corresponding to the second optical filtering element 124 may be oriented such that the second optical filtering element 124 can have a suitable inclination angle. For instance, in the circumstance where the reflective surface of the second optical filtering element 124 is perpendicular to the reflected light 132 which is incident on the second optical filtering element 124, the location of the end face 117 on which the second optical filtering element 124 is arranged may be inclined (e.g. by grinding) to the optical axis 116 of the first optical fiber 111 at an angle of "$90°-2\gamma$".

As illustrated in FIGS. 10 and 11, the end face 125 of the second port 123 is flush with the end face 127 of the second fiber accommodating member 122, i.e., the second optical fiber 121 is buried in the second fiber accommodating member 122. In this circumstance, as the end face 125 of the second port 123 is flush with the end face 127 of the second fiber accommodating member 122, the end face 125 and the end face 127 may be processed, e.g., ground and polished in a procedure, and the first optical filtering element 114 may be arranged on the whole end face of the second fiber pigtail assembly comprised of the end face 125 of the second optical fiber 121 and the end face 127 of the second fiber accommodating member 122 to cover the end face 125. Thus, it is not necessary to process the end face 125 separately and thus to simplify the processes and save the costs.

In the above embodiments, the optical filtering elements may be arranged at the corresponding end face or side surface, for example, by bonding, depositing and coating. The corresponding location of the end face or side surface of the optical fiber or the fiber accommodating member may be processed, e.g., grinded, polished, before the optical filtering element is mounted, in order to improve the transmission efficiency or other optical performance. The polished surface may further be coated with antireflection films.

Figure 12:
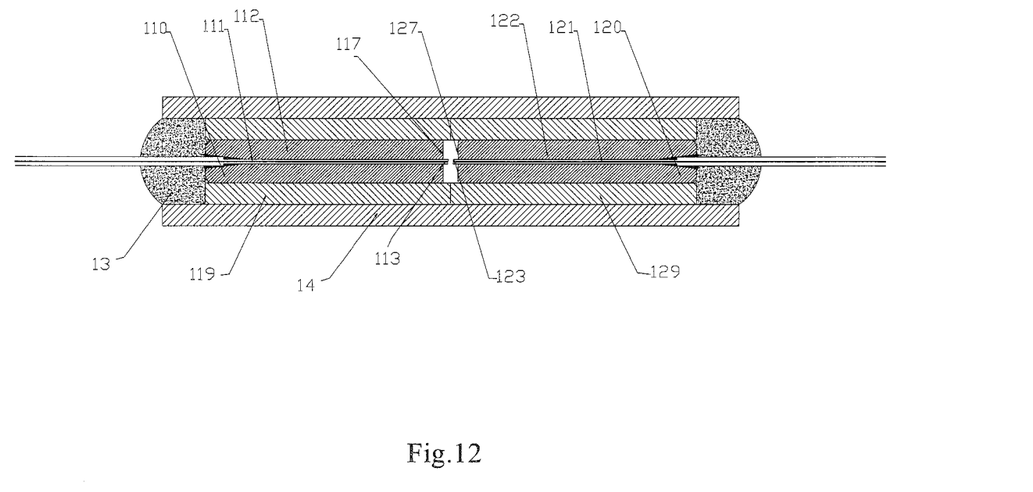
FIG. 12 is a schematic sectional view showing an optical fiber filter device according to another embodiment of the present invention.
Figure 13:
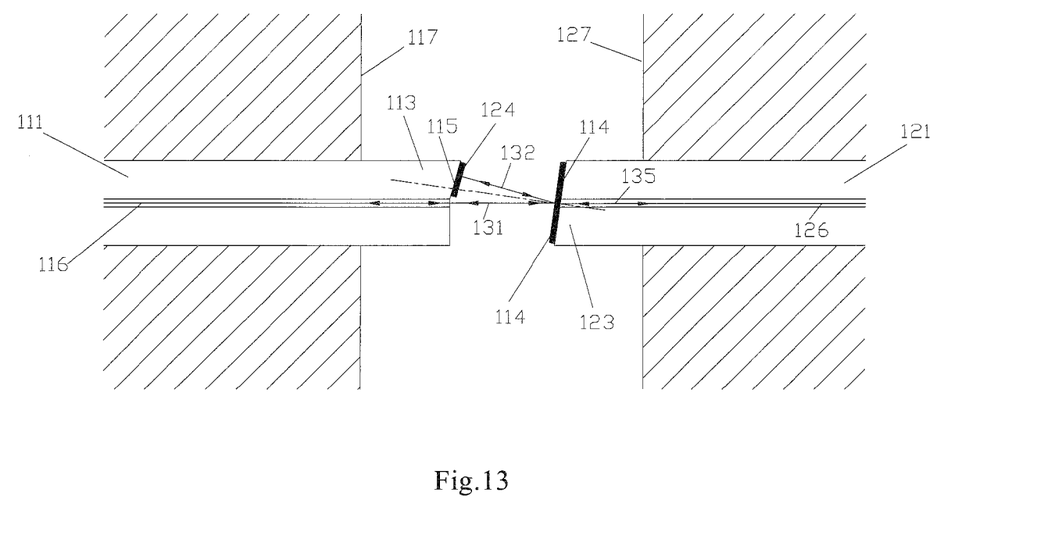
FIG. 13 is an enlarged view of the middle part of the optical fiber filter device shown in the FIG. 12.

FIGS. 12-13 show another embodiment of the optical fiber filter device according to the present invention. The embodiment has a substantially same construction as that shown in FIGS. 10-11 except for the arrangements of the first optical filtering element 114, the second optical filtering element 124 and the second port 123 of the second optical fiber 121.

In the embodiments shown in FIGS. 12 and 13, the second optical filtering element 124 is arranged on the end face 115 of the first port 113 of the first optical fiber 111 instead of being arranged on the end face 117 of the first fiber accommodating member 112 as the previous embodiments. Such arrangement can shorten the optical path and reduce the gap between the end face 115 of the first port 113 and the end face 125 of the second port 123. Thus, the optical fiber filter device may be more compact. In this circumstance, the location of the end face 115 (which can be located on either side external to the first optical fiber 111) corresponding to the second optical filtering element 124 may be oriented such that the second optical filtering element 124 can have a suitable inclination angle, before the second optical filtering element 124 is arranged. For instance, in the circumstance where the reflective surface of the second optical filtering element 124 is perpendicular to the reflected light 132 which is incident on the second optical filtering element 124, the location of the end face 115 on which the second optical filtering element 124 is arranged may be inclined (e.g. by grinding) to the optical axis 116 of the first optical fiber 111 at an angle of "$90°-2\gamma$".

In the embodiments shown in FIGS. 12-13, the end face 125 of the second port 123 may protrude from the end face 127 of the second fiber accommodating member 122, and the first optical filtering element 114 is arranged on the protruded end face 125. In this case, after the corresponding location of the end face of the optical fiber or the fiber accommodating member is processed, the end face 125 of the second port 123 is necessarily processed separately to ensure high transmission efficiency before the first optical filtering element 114 is mounted. Thus, the process of the end face 125 of the second port 123 is separated from the process of the end face 127 of the second fiber accommodating member 122 in order to prevent the quality of the end face 125 from being deteriorated by the process of the end face 127.

In an embodiment, the end face 117 of the first fiber accommodating member 112 and end face 127 of the second fiber accommodating member 122 may be inclined to the optical axis 116 of the first optical fiber 111 and the optical axis 126 of the second optical fiber 121, as illustrated in FIGS. 10 and 11. Alternatively, the end face 117 of the first fiber accommodating member 112 and end face 127 of the second fiber accommodating member 122 may be perpendicular to the optical axis 116 and the optical axis 126, as shown in FIGS. 12 and 13.

In the above embodiments, the arrangement in which the end face 125 of the second port 123 of the second optical fiber 121 is flush with the end face 127 of the second fiber accommodating member 122 is used in combination with the arrangement in which the second optical filtering element 124 is arranged on the end face 117 of the first fiber accommodating member 112, while the arrangement in which the end face 125 of the second port 123 of the second optical fiber 121 protrudes from the end face 127 of the second fiber accommodating member 122 is used in combination with the arrangement in which the second optical filtering element 124 is arranged on the end face 115 of the first port 113 of the first optical fiber 111. However, the present invention is not limited to this. For instance, the arrangement in which the end face 125 of the second port 123 of the second optical fiber 121 is flush with the end face 127 of the second fiber accommodating member 122 may also be used in combination with the arrangement in which the second optical filtering element 124 is arranged on the end face 115 of the first port 113 of the first optical fiber 111, or the arrangement in which the end face 125 of the second port 123 of the second optical fiber 121 protrudes from the end face 127 of the second fiber accommodating member 122 may be used in combination with the arrangement in which the second optical filtering element 124 is arranged on the end face 117 of the first fiber accommodating member 112.

In the above embodiments shown in Figures, the first optical filtering element 114 and the second optical filtering element 124 are arranged such that the reflected light 132 is reflected by the first optical filtering element 114 and the second optical filtering element 124 again twice. However, the present invention is not limited to this. For instance, the other optical paths in which the reflected light 132 can be reflected by the optical filtering elements may also be designed to improve the reflection isolations, for example, adjusting the optical path by increasing additional reflective elements to redirect the reflected light 132, or allowing the reflected light 132 to be reflected three or more times before it returns to the first optical fiber 113.

In an embodiment, the first optical filtering element 114 and the second optical filtering element 124 may have same optical filtering performance, or may have a certain offset of the center wavelengths or filtering bands with each other, as long as they can transmit the light within the first wavelength range ($\lambda_{1a}, \lambda_{1b}$) and reflect the light within the second wavelength range ($\lambda_{2a}, \lambda_{2b}$). All of these solutions fall within the concept of the present invention. The optical filtering elements are also not limited to the film filters.

In an embodiment, the second optical fiber 121 may also receive other working light 135 (as illustrated in FIGS. 2, 3 and 5-7), for example, the optical signals for transmissions and detections, and allow it to exit the second port 123 and then enter the first optical fiber 111 via the first port 113. That is, the optical fiber filter device may allow the optical signals for achieving other functions to pass while achieving the above operation of the optical filtering. It further may improve the density of the integration of the optical system.

In the above embodiments, two optical filtering elements are used to reflect the light emitted from the first optical fiber 111 at least three times in total. However, as appreciated by the skilled person in the art, more optical filtering elements may be used in combination to reflect the light emitted from the first optical fiber 111 at least three times in order to improve the reflection isolations of the light returning to the first optical fiber 111. These solutions also fall within the scope of the present invention.

The skilled person in the art would appreciate that the above embodiments are only illustrative; the present invention may further be implemented in other forms. For instance, the first and second optical fibers or the first and second fiber pigtail assemblies with the above optical filtering arrangements may be provided in other housing components, such as a lock pin or a V-shaped groove, or may be integrated with other optical-electronic devices together to improve interconnection or the integrated level.

The present invention also provides a method for manufacturing an optical fiber filter device. As an example, for the optical fiber filter device 100 shown in FIG. 1, at first, a first fiber pigtail assembly 110, a second fiber pigtail assembly 120, a first optical filtering element 114 and a second optical filtering element 124 are provided. The first fiber pigtail assembly 110 may comprise a first optical fiber 111 and a first fiber accommodating member 112 which accommodates the first optical fiber 111. The second fiber pigtail assembly 120 may comprise a second optical fiber 121 and a second fiber accommodating member 122 which accommodates the second optical fiber 121. The first optical fiber 111 has a first port 113 and the second optical fiber 121 has a second port 123. The first and second optical filtering elements 114, 124 each may transmit a light within a first wavelength range and reflect a light within a second wavelength range.

Subsequently, the first optical filtering element 114 is arranged in an optical path of a light emitted from the first port 113, and inclined at an angle to an optical axis 116 of the first optical fiber 111 such that the light component within the first wavelength range emitted from the first port 113 is transmitted through the first optical filtering element 114, and the light component within the second wavelength range emitted from the first port 113 is reflected by the first optical filtering element 114 to form the reflected light 132. The second optical filtering element 124 may be arranged in an optical path of the reflected light such that the reflected light 132 returns to the first optical fiber 111 via the first port 113 after it has been reflected by the first and second optical filtering elements 114, 124 again at least twice.

Then, the first and second fiber pigtail assemblies 110, 120 are accommodated in a tube to allow the light transmitted through the first optical filtering element 114 to enter the second optical fiber 121 via the second port 123. At last, the first and second fiber pigtail assemblies 110, 120 are fixed in combination with the tube to form the optical fiber filter device 100.

In an embodiment, after the first optical filtering element 114 and the second optical filtering element 124 are provided, the optical paths may be adjusted such that the reflected light 132 is reflected by the first and second optical filtering elements 114, 124 to enter the first optical fiber 111 with a maximum power.

In an embodiment, after the first fiber pigtail assembly 110 and the second fiber pigtail assembly 120 are accommodated in the tube respectively, the optical paths may be adjusted such that the light transmitted through the first optical filtering element is coupled to the second fiber with a maximum coupling efficiency. In particular, the optical paths may be adjusted by regulating the position of the optical axis 126 of the second optical fiber with respect to the optical axis 116 of the first optical fiber, e.g., by regulating the shift or inclination angle of the optical axis 126 of the second optical fiber with respect to the optical axis 116 of the first optical fiber, in order to improve the coupling efficiency of the optical fibers.

In an embodiment, when the first fiber pigtail assembly 110 and the second fiber pigtail assembly 120 are loaded into the tube, the space between the first port 113 and the second port 123 may be filled with a refractivity-matched substance, in order to decrease the optical loss, reduce the Fresnal reflections and improve the coupling efficiency of the optical fibers.

In an embodiment, the first optical filtering element 114 may be arranged, e.g., bonded or deposited directly, onto the end face 115 of the first port 113.

In an embodiment, the second optical filtering element 124 may be arranged, e.g., bonded or deposited directly, onto the side surface of the first optical fiber 111 adjacent to the first port 113; or the second optical filtering element 124 may be embedded in the first optical fiber 111 adjacent to the first port 113.

In an embodiment, in order to improve the transmission efficiency or other optical performance, the end face or the side surface may be polished and coated with antireflection films before the first or the second optical filtering element is bonded or deposited.

In an embodiment, a groove in which the second optical filtering element 124 is accommodated may be formed at the location of the side surface corresponding to the second optical filtering element 124 to make it easier to process, e.g., grind or polish the side surface of the second optical filtering element 124.

In another embodiment, the first optical filtering element 114 may be arranged, e.g., bonded or deposited directly onto the end face 125 of the second port 123. The end face 125 of the second port 123 may be flush with the end face 127 of the second fiber accommodating member 122, in order to perform simultaneously the processing of the end face 125 of the second port 123 and the processing of the end face 127 of the second fiber accommodating member 122 together.

In an embodiment, the second optical filtering element 124 may be arranged, e.g., bonded or deposited directly onto the end face 117 of the first fiber accommodating member 112 external to the first optical fiber 111. Furthermore, in order to improve the optical transmission efficiency or other optical performance, the end face 125 of the second port 123 and the end face 117 of the first fiber accommodating member 112 may be polished and coated with antireflection films before the first or the second optical filtering element is arranged.

In an embodiment, the second optical filtering element 124 may be arranged, e.g., bonded or deposited directly onto the end face 115 of the first port 113. Furthermore, in order to improve the optical transmission efficiency or other optical performance, the end face 125 of the second port 123 and the end face 115 of the first port 113 may be polished and coated with antireflection films before the first or the second optical filtering element is arranged.

Although the embodiments of the present invention have been described in conjunction with figures, modifications to the above embodiments can be carried out without departing the spirit of the present invention.

The above technical features or various structures of the present invention can be mutually combined to form new structures. It can be appreciated by those skilled in the art that the combinations fall within the scope of the present invention.

The invention claimed is:

1. An optical fiber filter device, comprising:
   a first fiber pigtail assembly and a second fiber pigtail assembly, the first fiber pigtail assembly comprising a first optical fiber and a first fiber accommodating member which accommodates the first optical fiber, the second fiber pigtail assembly comprising a second optical fiber and a second fiber accommodating member which accommodates the second optical fiber, the first optical fiber having a first port and the second optical fiber having a second port; and
   a first optical filtering element and a second optical filtering element, which each transmit a light within a first wavelength range and reflect a light within a second wavelength range,
   wherein the first optical filtering element is arranged between the first port and the second port and is inclined at an angle to an optical axis of the first optical fiber such that a light component within the first wavelength range emitted from the first port is transmitted through the first optical filtering element and enters the second optical fiber via the second port, and a light component within the second wavelength range emitted from the first port is reflected by the first optical filtering element to form a reflected light, and wherein the second optical filtering element is arranged in an optical path of the reflected light such that the reflected light returns to the first optical fiber via the first port after it has been reflected by the first and second optical filtering elements wherein the first and the second optical filtering element are located on the first and/or the second port and/or on the first and/or the second fiber accommodating member.

2. The optical fiber filter device according to claim 1, wherein a space between the first port and the second port is filled with a refractivity-matched substance.

3. The optical fiber filter device according to claim 1, wherein the angle is more than 0 degrees and less than 90 degrees.

4. The optical fiber filter device according to claim 3, wherein the angle is 45 degrees.

5. The optical fiber filter device according to claim 1, wherein a reflective surface of the second optical filtering element is perpendicular to a direction in which the reflected light is incident on the second optical filtering element.

6. The optical fiber filter device according to claim 1, wherein the light component within the first wavelength range emitted from the first port enters the second optical fiber via the second port along an optical axis of the second optical fiber.

7. The optical fiber filter device according to claim 1, wherein the first optical filtering element is arranged on an end face of the first port.

8. The optical fiber filter device according to claim 7, wherein the second optical filtering element is arranged on a side surface of the first optical fiber adjacent to the first port.

9. The optical fiber filter device according to claim 8, wherein the end face of the first port protrudes from an end face of the first fiber accommodating member and an end face of the second port protrudes from an end face of the second fiber accommodating member.

10. The optical fiber filter device according to claim 8, wherein the end face of the first port is flush with an end face of the first fiber accommodating member and an end face of the second port is flush with an end face of the second fiber accommodating member.

11. The optical fiber filter device according to claim 10, wherein the first fiber accommodating member is provided with a slit or a side opening for receiving the second optical filtering element.

12. The optical fiber filter device according to claim 10, wherein the first optical filtering element is arranged on an end face of the second port.

13. The optical fiber filter device according to claim 12, wherein the second optical filtering element is arranged on an end face of the first fiber accommodating member external to the first optical fiber.

14. The optical fiber filter device according to claim 13, wherein the end face of the second port is flush with an end face of the second fiber accommodating member.

15. The optical fiber filter device according to claim 13, wherein the end face of the second port protrudes from an end face of the second fiber accommodating member.

16. The optical fiber filter device according to claim 12, wherein the second optical filtering element is arranged on an end face of the first port.

17. The optical fiber filter device according to claim 10, wherein the first and second optical filtering elements are film filters.

18. The optical fiber filter device according to claim 10, further comprising:
    a tube in which the first and second optical filtering elements and the first and second fiber pigtail assemblies are accommodated separately or in combination; and
    a housing in which the tube is accommodated.

19. The optical fiber filter device according to claim 7, wherein the second optical filtering element is embedded in the first optical fiber adjacent to the first port.

20. The optical fiber filter device according to claim 7, wherein the end face of the first fiber accommodating member is perpendicular to the optical axis of the first optical fiber, and the end face of the second fiber accommodating member is perpendicular to the optical axis of the second optical fiber.

21. The optical fiber filter device according to claim 7, wherein the end face of the first fiber accommodating member is inclined to the optical axis of the first optical fiber, and the end face of the second fiber accommodating member is inclined to the optical axis of the second optical fiber.

22. A method for manufacturing an optical fiber filter device, comprising the steps of:
    (a) providing a first fiber pigtail assembly, a second fiber pigtail assembly, a first optical filtering element and a second optical filtering element, the first fiber pigtail assembly comprising a first optical fiber and a first fiber accommodating member which accommodates the first optical fiber, the second fiber pigtail assembly comprising a second optical fiber and a second fiber accommodating member which accommodates the second optical fiber, the first optical fiber having a first port and the second optical fiber having a second port, the first and second optical filtering elements each transmitting a light within a first wavelength range and reflecting a light within a second wavelength range;
    (b) arranging the first optical filtering element in an optical path of a light emitted from the first port, inclining it at an angle to an optical axis of the first optical fiber such that a light component within the first wavelength range emitted from the first port is transmitted through the first optical filtering element, and a light component within the second wavelength range emitted from the first port is reflected by the first optical filtering element to form a reflected light, and arranging the second optical filtering element in an optical path of the reflected light such that the reflected light returns to the first optical fiber via the first port after it has been reflected by the first and second optical filtering elements and locating the first and the second optical filtering element on the first and/or the second port and/or the first and/or the second fiber accommodating member;
    (c) accommodating the first and second fiber pigtail assemblies in a tube to allow the light transmitted through the first optical filtering element to enter the second optical fiber via the second port; and
    (d) securing the first and second fiber pigtail assemblies in combination with the tube.

23. The method according to claim 22, wherein the step (b) further comprises:
    filling a space between the first port and the second port with a refractivity-matched substance.

24. The method according to claim 22, wherein the step (b) further comprises:
    adjusting the optical paths such that the reflected light is reflected by the first and second optical filtering elements to enter the first optical fiber with a maximum power; and wherein the step (c) further comprises:
adjusting the optical paths such that the light transmitted through the first optical filtering element is coupled to the second fiber with a maximum coupling efficiency.

25. The method according to claim 22, further comprising:
bonding or depositing directly the first optical filtering element onto an end face of the first port.

26. The method according to claim 25, further comprising:
bonding or depositing directly the second optical filtering element onto a side surface of the first optical fiber adjacent to the first port, or
embedding the second optical filtering element in the first optical fiber adjacent to the first port.

27. The method according to claim 25, further comprising:
polishing the end face or the side surface and coating the end face or the side surface with antireflection films before the first or the second optical filtering element is bonded or deposited.

28. The method according to claim 22, further comprising:
bonding or depositing directly the first optical filtering element onto an end face of the second port.

29. The method according to claim 28, further comprising:
bonding or depositing directly the second optical filtering element onto an end face of the first fiber accommodating member external to the first optical fiber.

30. The method according to claim 28, further comprising:
bonding or depositing directly the second optical filtering element onto an end face of the first port.

* * * * *